April 23, 1963 K. E. HUMBERT, JR., ETAL 3,086,656
FILTER CARTRIDGE
Original Filed Jan. 10, 1955 3 Sheets-Sheet 1
FIG. 1.
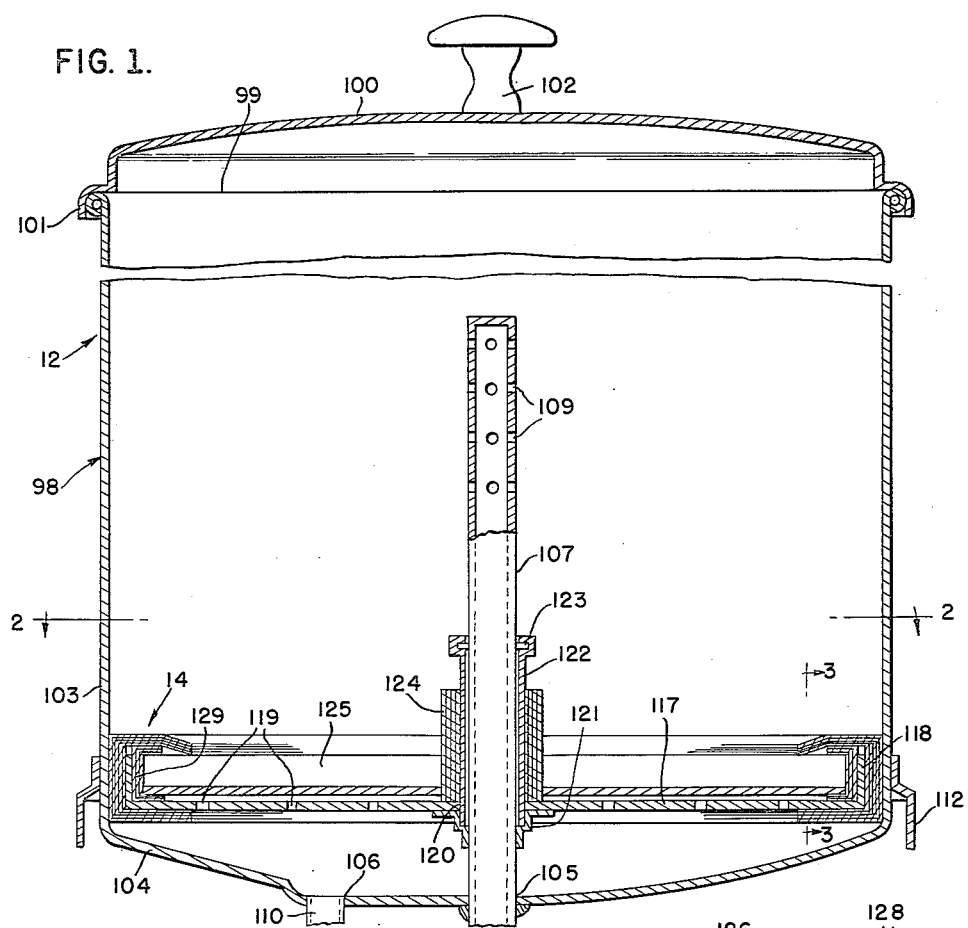
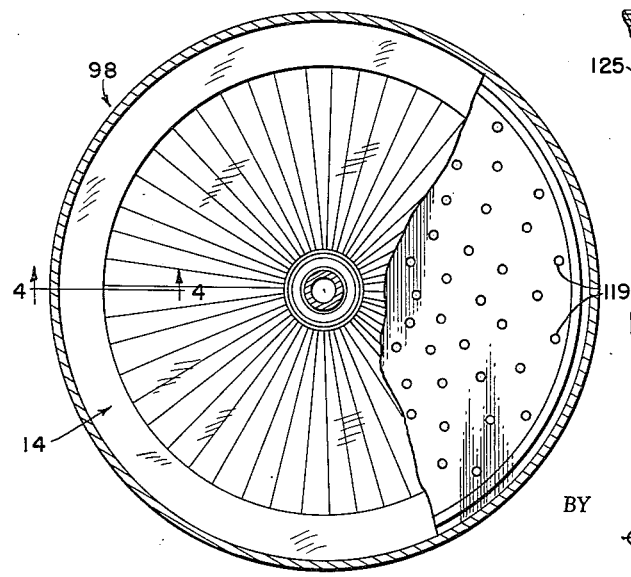
FIG. 2.
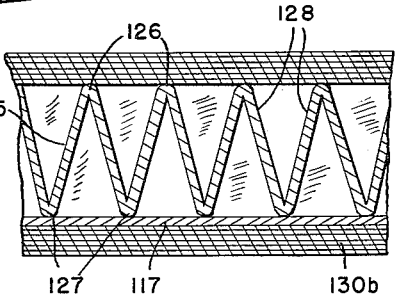
FIG. 3.
INVENTORS
Kingsley E. Humbert, Jr.
Ralph L. Young
Lewis M. Hough, Jr.
BY Shoemaker & Mattare
ATTORNEYS April 23, 1963  K. E. HUMBERT, JR., ETAL  3,086,656
FILTER CARTRIDGE Original Filed Jan. 10, 1955  3 Sheets-Sheet 2

INVENTORS
Kingsley E. Humbert, Jr.
Ralph L. Young
Lewis M. Hough, Jr.
BY Shoemaker + Mattare
ATTORNEYS

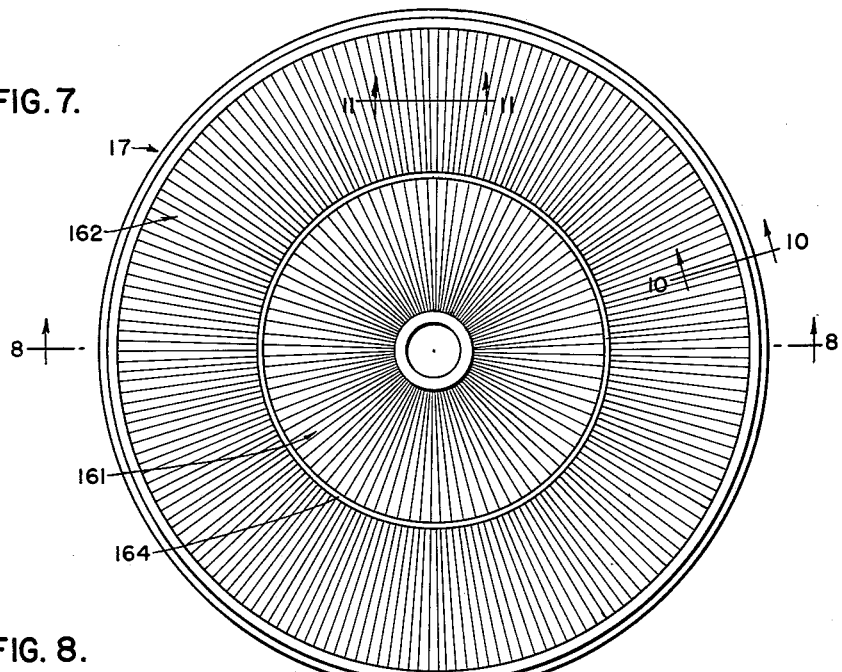
FIG. 7.
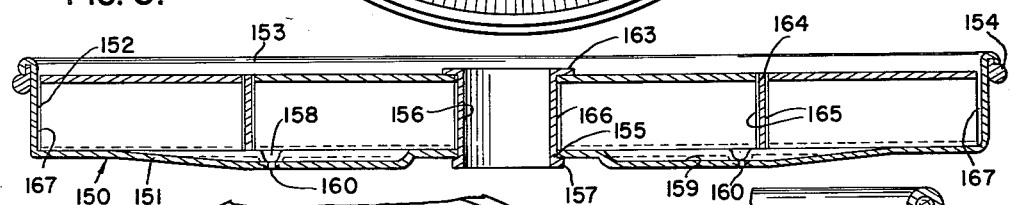
FIG. 8.
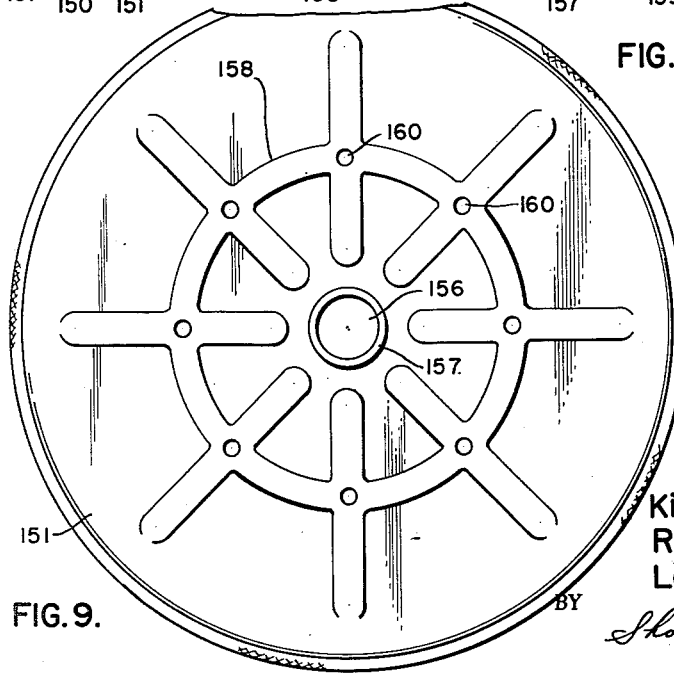
FIG. 9.
FIG. 10
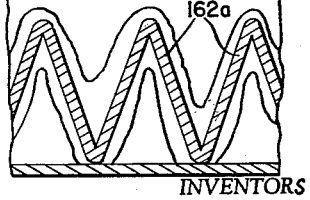
FIG. 11.
INVENTORS
Kingsley E. Humbert, Jr.
Ralph L. Young
Lewis M. Hough, Jr.
BY
ATTORNEYS United States Patent Office 3,086,656
Patented Apr. 23, 1963

3,086,656
FILTER CARTRIDGE
Kingsley E. Humbert, Jr., Ralph L. Young, and Lewis M. Hough, Jr., all of Gastonia, N.C., assignors to Wix Corporation, Gastonia, N.C., a corporation of North Carolina
Original application Jan. 10, 1955, Ser. No. 480,826. Divided and this application Dec. 9, 1958, Ser. No. 779,214
6 Claims. (Cl. 210—493)

This invention relates generally to the class of liquid filters or filtering and is directed particularly to an improved and novel filtering cartridge adapted for insertion into a filtering receptacle and particularly a receptacle wherein means is provided for introducing the liquid to be filtered above the filtering unit and for withdrawing it from the underside thereof.

The present invention is a division of our pending application Serial No. 480,826, filed January 10, 1955.

In the parent application there is disclosed a portable filter apparatus embodying a receptacle mounted on a wheeled structure or adapted for mounting on any other type of structure whereby it may be moved from place to place for use and the apparatus includes in addition to the filter receptacle, pumping apparatus and a novel multi-way valve by means of which liquid to be filtered can be withdrawn from a source, introduced into the receptacle on one side of the filter unit therein and then withdrawn as cleaned filtered liquid from the other side of the unit and from the receptacle and returned to its source.

The apparatus of the parent application is designed particularly for use in establishments such as restaurants and the like where cooking oils are used and which oils after a period of repeated use become contaminated so that unless they are cleansed, they must be discarded and new oil used and the apparatus in question forming the parent application is designed in a novel manner and uses a filter constructed in accordance with the present disclosure, which is readily inserted into the filtering receptacle and maintained in place by means of an inlet pipe or tube which passes through the center of the filter unit or cartridge.

A particular object of the present invention is to provide a new and novel filter cartridge adapted to be placed into a receptacle of the character stated so that it will form a relatively tight frictional engagement between its periphery and the wall of the receptacle so as to establish a partition of filtering material in the receptacle through which the liquid to be cleansed is caused to pass.

A further and more especial object of the invention is to provide, for use in a filter receptacle of the character described, a flat filter disc of novel construction having an over-all diameter approximately equal to the inside diameter of the receptacle in which it is placed in a plane perpendicular to the axis of the receptacle with its periphery in tight frictional contact with the receptacle wall and having a central opening adapted to receive the contaminated liquid inlet tube whereby the filter disc or filter cartridge when introduced into the receptacle may be slipped over such admission tube and the disc being formed in a novel manner whereby to establish a tight frictional engagement with the tube to avoid any possibility of unfiltered liquid passing downwardly around the tube and through the opening of the disc and into the filtered liquid lying below the filter disc or cartridge in the receptacle.

More specifically the invention contemplates the provision of a filter cartridge designed for use in a filter receptacle having a liquid inlet tube, as above stated, one embodiment of which cartridge is in the form of a disc or flat annulus of folded or pleated filter paper wherein the fold lines lie substantially radial with respect to the disc and the container and the pleats having angular relationship with a plane lying perpendicular to the axis of the cartridge, the periphery of such disc or flat annulus lying in an inwardly facing channel of an encircling band of filter material which is designed to have tight sliding contact with the wall of the receptacle or container.

In another embodiment of the novel filter disc cartridge, the filter media comprises a spirally wound absorbent material whereby the cleaning of fluid passing therethrough is effected by the myriad cells in the material and between the layers of the material, where such material is of an absorbent nature or, where the material may be of a non-absorbent nature, the fluid is cleansed in passing between the closely spaced or compacted layers of such material.

The invention will be best understood from a consideration of the following detail description taken in connection with the accompanying drawings forming part of the specification, with the understanding, however, that the invention is not confined to a strict conformity with the showing of the drawings but may be changed or modified so long as such changes or modifications mark no material departure from the salient features of the invention as expressed in the appended claims.

In the drawings:

FIG. 1 is a sectional view taken in a vertical plane radially through a receptacle of the character illustrated in the parent application and illustrating therein, also in radial section, one embodiment of the filter cartridge or filter disc of the present invention and also showing the upper end of a liquid inlet tube in longitudinal section;

FIG. 2 is a horizontal section taken, on a reduced scale, substantially in the plane of section line 2—2 on FIG. 1;

FIG. 3 is a partial sectional view on an enlarged scale taken substantially on the line 3—3 of FIG. 1;

FIG. 7 is a view in top plan of another embodiment of the filter cartridge, wherein concentric pleated filter elements are employed;

FIG. 8 is a transverse section taken substantially on the line 8—8 of FIG. 7;

FIG. 9 is a view in bottom plan of the cartridge shown in FIG. 7;

FIG. 10 is a sectional detail taken substantially on the line 10—10 of FIG. 7; and FIG. 11 is a partial section taken substantially on the line 11—11 of FIG. 7.

Figure 5:
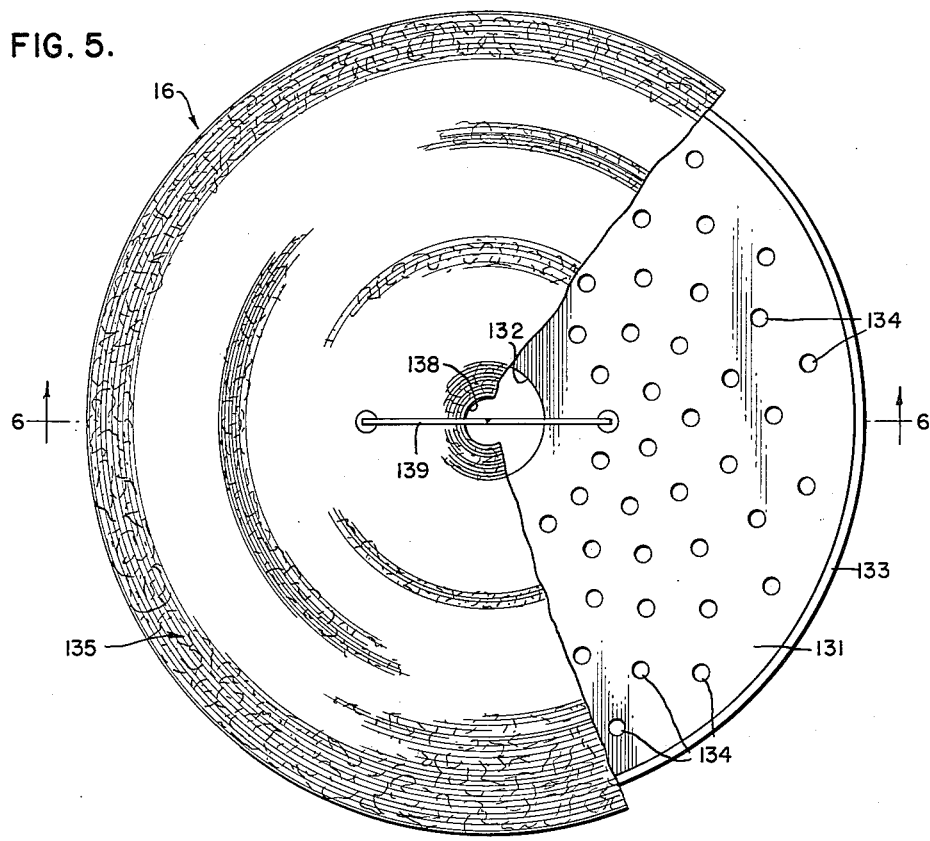
FIG. 5 is a view illustrating in top plan one embodiment of the filter cartridge with a portion of the filter material broken away to show the underlying perforated supporting plate.

Referring now more particularly to the drawings, FIG. 1 illustrates a receptacle such as that illustrated in the parent application, in which the filter cartridge of the present invention is adapted to be used. This receptacle or tank is generally designated 12 and it is shown having housed therein the removable and replaceable filter cartridge, in one embodiment thereof, and which one embodiment is generally designated 14. Second and third embodiments of the invention, which are adapted to be positioned in the receptacle in the same manner as the first embodiment 14 in place thereof or in substitution therefor, are illustrated in FIGS. 5 to 11 and these second and third embodiments are respectively designated 16 and 17.

The filter tank or receptacle in which one embodiment of the invention is illustrated comprises the tank proper which is designated 98 and which is of circular design, as shown, having the open top 99 which is closed by the removable cover 100. The periphery of the cover has the outwardly and downwardly directed flange 101 which engages over the rolled top edge of the tank and a suitable handle 102 is provided for lifting or handling the cover.

The circular wall 103 of the tank merges with a downwardly depressed or dished bottom wall 104 which has a central opening 105 formed therethrough and a second opening 106 positioned eccentrically of the tank bottom.

The numeral 107 designates a liquid inlet or admission tube which at its lower end extends through the opening 105 as shown, for connection with a source of supply of liquid which is to be filtered and this tube extends upwardly in the receptacle through the major portion of the height thereof. The lower end of the tube 107 is permanently secured as by welding or otherwise in the opening 105.

The upper end of the tube 107 is closed and the wall of the tube beneath the closed upper end is provided with a plurality of inlet apertures 109.

The numeral 110 designates a second tube having an end fixed in the opening 106 and this tube may be connected with a suitable pump or other draw-off means or may simply be provided for withdrawing filtered liquid from the tank by gravity, if desired.

In the parent application the tank 98 is mounted over a supporting wheeled or roller-supported platform and the means there provided for maintaining the tank in proper position over such platform embodies a skirt 112 which is secured around the bottom of the tank and rests on the platform.

No further details of the apparatus of the parent application relating to the structure associated with the tank or lying therebeneath are believed necessary in view of the restriction of this application to the filter cartridge structure divided out of the parent application, but the preceding description and illustration of the tank are given to show the manner in which the filter cartridge or disc is designed to be used.

Disposed within the tank 98 at any suitable elevation, but preferably below the series of liquid inlet apertures 109, is the filter cartridge designated 14 or, in the same position, a cartridge of the modified form shown in FIG. 5 and designated 16, may be positioned. These cartridges are of disc form and of an over-all diameter to fit snugly and concentrically within the tank as the cartridge 14 is illustrated in FIG. 1. Each of these cartridges comprises a flat body of suitable filter material centrally apertured to clip over the pipe 107 and carried upon an apertured base disc or plate.

Referring specifically to the filter cartridge 14 shown in FIGS. 1, 2, 3 and 4, there is shown a thin base disc 117 which has an upturned peripheral wall flange 118 and which is provided with a multiplicity of apertures 119. The center of the disc 117 has an opening 120 therein and secured to the underside of the disc concentric with the opening is a downwardly extending collar 121 the lower end of which is of an inside diameter to snugly receive the pipe 107 while the upper portion is of slightly larger diameter corresponding to the diameter of the opening 120.

Extending through the opening 120 and into the upper part of the collar 121 is the lower end of a metal tube 122 which rises a substantial height above the plane of the top edge of the disc flange 118.

The upper end of the tube 122 has fitted therein a gasket 123 which when the filter is in position tightly encircles the pipe 107 as illustrated.

Surrounding the tube 122 is an upstanding sleeve 124 which is formed of a multiplicity of layers of suitable filter paper or other filtering material and resting upon the disc 117 and encircling the sleeve 124 is a radially fluted filter annulus 125 which closely engages in its center opening about the sleeve 124 with the inner edges of the flutes pressing against the sleeve while the outer edges of the flutes are in opposed relation with the flange 118.

FIG. 3 shows a detail section on an enlarged scale of a portion of the fluted annulus 125 wherein the top and bottom edges of the flutes are designated 126 and 127 respectively while the faces of the flutes which form alternate upright and inverted V's are designated 128 and, as shown, are at an inclination to the horizontal.

Figure 4:
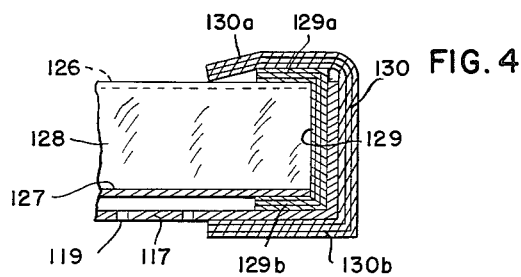
FIG. 4 is a sectional detail taken substantially on the line 4—4 of FIG. 1.

Encircling the fluted annulus 125 is a band made up of a number of layers of filter material which band is designated 129 and, as shown in detail in FIG. 4, lies against the outer end edges of the flutes and has upper and lower edge portions 129a and 129b turned in to lie over the top and bottom edges of the flutes. This band 129 is interposed between the outer end edges of the flutes or the peripheral portion of the fluted annulus and the upturned flange 118 of the disc 117.

Upon the outside of the flange forming wall 118 and completely encircling the latter is an outer relatively thick band of filter material which is generally designated 130 and which may be made up of a multiplicity of layers of filter paper or other absorbent filter substance, or a non-absorbent substance as may be desired, and this band has upper and lower inturned edge portions 130a and 130b which lie upon the top and bottom edges of the flutes as shown in FIG. 4. Suitable adhesive may be employed for maintaining the filter bands 129 and 130 in position and the outer filter band 130 functions as a packing ring between the flange 118 and the inner wall of the tank when the filter cartridge is inserted therein so that no fluid can pass between the filter cartridge and the tank wall.

The filter cartridge 16 like the cartridge 14, includes in its structure a flat base disc 131 of relatively thin material, having a central opening 132 and an upturned surrounding flange forming wall 133. In addition to the central opening the disc 131 is provided with a multiplicity of smaller openings 134 for the passage of fluid therethrough.

The disc 131 forms a supporting tray or pan for the filter material 135 positioned on top thereof and maintained in place by the flange wall 133 and in this embodiment the material 135 is in the form of a band of a width approximately twice the height, or slightly more, than the flange 133 and this material is spirally wound to form the substantially solid annulus made up of the spiral layers 136 and such annulus is initially of an over-all diameter somewhat greater than the diameter of the flange wall 133 and is tightly compressed within the flange wall 133 so that a portion of the filtering material annulus expands or bulges slightly beyond the flange wall 133 as indicated at 137.

In the formation of the annular filter body 135 there is provided the central opening 138 which is adapted to snugly receive the inlet pipe 107 when the cartridge is placed in position in the tank 98. This opening 138 is somewhat smaller than the diameter of the pipe so that a tight engagement will be effected between the material of the filter body and the pipe and to permit this the opening 132 of the disc 131 is made materially larger than the opening 138 of the filter body.

To facilitate withdrawal of the cartridge unit 16 from the liquid tank a wire bale handle 139 may be provided by running a length of wire downwardly through the filter material and through one of the apertures 134 then carrying it across the center of the cartridge to an aperture 134 on the other side of the opening 132 and passing it back upwardly through the filter material and then connecting the ends of the wire together in the manner shown. While this specific form of means has been illustrated for removing the filter cartridge from the tank it is to be understood that any other suitable means may be employed if desired.

As previously set forth in connection with the cartridge 14 when this is placed in the tank 98 the upper end of the pipe 107 is caused to slide upwardly through the collar 121, the tube 122 and the gasket 123 and the unit is pressed down into the tank until it is well below the apertures 109. The diameter of the cartridge is such that when it is inserted in this manner the band 130 will be pressed tightly against the wall of the tank as previously stated.

Figure 6:
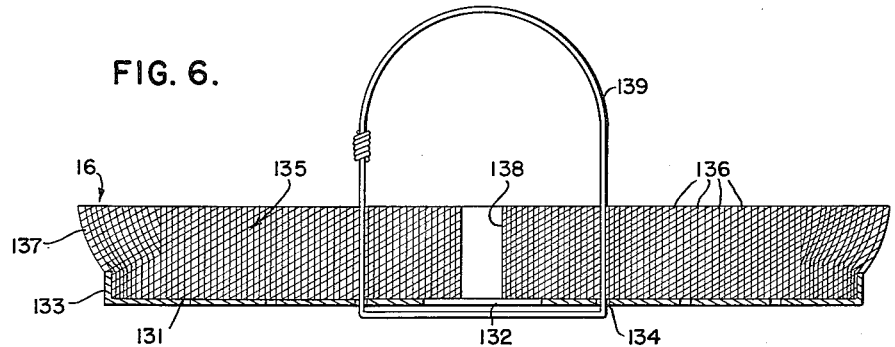
FIG. 6 is a transverse section taken substantially on the line 6—6 of FIG. 5.

In inserting a cartridge constructed as illustrated in FIGS. 5 and 6, and designated 16, the expanding or bulging portion 137 of the filter annulus will be pressed in the same manner against the wall of the tank. In this construction the over-all diameter of the disc flange 133 may be only slightly less than the inside diameter of the tank so that the bulging portion 137 will be forced or compressed inwardly when the cartridge is placed in position and thus the same fluid tight contact will be had with the wall of the tank for the purpose stated.

The third embodiment of the filter cartridge, generally designated 17, is designed for rapid fluid flow, by reason of the novel form of the bottom of the unit upon which the fluted filter paper, or fluted filter sheet material, is supported. It also provides a larger total area of filter surface by the novel concentric arrangement of two annular fluted bodies in the manner hereinafter set forth.

In this third embodiment the cartridge comprises a circular pan 150 in which the filter material is carried. This pan comprises the bottom 151 and vertical wall 152, the top edge of which is outwardly rolled as at 153.

The over-all diameter of the pan 150 is slightly less than the inside diameter of the tank 98.

In this construction the desired tight seal is obtained between the peripheral portion of the pan by the provision of a soft packing gasket annulus 154 which encircles the wall 152 below the rolled rim 153 as shown. While any suitable means may be employed to secure the gasket in position, one such means consists in clamping a portion of the gasket in the rolled bead or rim, as the latter is turned, so that a part of the gasket material is enclosed in the bead and the gasket hangs below the same.

When this cartridge is placed in the tank the gasket will be tightly compressed between the tank wall and the pan wall.

The pan bottom is provided in the center thereof with an opening 155, in which is secured one end of a guide tube 156, the function of which will be hereinafter set forth. The lower end of this tube is rolled or turned out as at 157 to secure it against withdrawal upwardly.

To facilitate free and rapid flow of liquid from the pan after passing through the filter material therein, the bottom 151 is pressed downward to form an upwardly opening annular gutter 158, and a plurality of radial, straight channels 159 which cross or intersect the gutter and which start adjacent to the pan wall 154 and gradually decrease in depth toward their inner ends, or toward the pan center.

The gutter 158 and the radial feeder channels 159 are of the same depth where they cross, or intersect, and at each such location an outlet aperture 160 is formed for drainage.

Arranged concentrically in the pan, concentric with the tube 156, are the two annular, flat filter elements 161 and 162.

The inner element 161 closely, or snugly, encircles the tube 156 and the top edge portion of the tube is outturned to form the flange 163 which lies upon the top of the filter element as shown in FIG. 8.

Both filter elements are radially fluted, whereby there are formed the angularly related and steeply inclined fluted walls 162a, as shown in FIG. 11, which illustrates a section of the outer element 162. It will thus be apparent that the flutes of the outer element 162 have outer end edges, opposing the pan wall 152, and inner end edges which oppose, but do not coincide with, outer end edges of the flutes of the inner element 161. The inner element flutes have end edges opposing the tube 156 from which they radiate.

Positioned in the pan upon the bottom thereof between the opposing edges of the flutes of the inner and outer filter elements, is the annular division wall, or fence, 164.

The ends of the flutes of the filter elements which oppose and abut the division wall, or fence, 164, are cemented as at 165 to the wall by a suitable adhesive such as an oil and water insoluble resin, or any other desirable or suitable adhesive.

The inner end edges of the flutes of the element 161, and the outer end edges of the flutes of the element 162 are likewise cemented respectively to the outer surface of the tube 156, as indicated at 166, and to the inner surface of the wall 152, as indicated at 167.

It will be seen from the foregoing that while the third embodiment of the filter cartridge just described, includes two flat pleated, or fluted, filter elements, the concentric relation thereof, with the bonding of the elements together, forms a single or unitary filter disc analogous to the first and second described embodiments. However, by the provision of the two separate filter elements a larger number of flutes may be provided in the outer element than in the inner one, and accordingly a larger total filter area is obtainable than could be had with a single sheet of filter material in which the flutes run from the center tube to the outer wall of the pan.

While the third embodiment of the filter cartridge has been illustrated as embodying the two concentric filter elements it will, of course, be obvious that the pan in the form shown may be employed to carry filter elements of the character shown in FIGS. 2 and 5.

It is believed to be readily obvious that the filter cartridge 17 is designed to be inserted in the tank 98 by sliding the tube 156 down on the inlet pipe 107, either to the lowermost position, as the cartridge 14 is shown in FIG. 1, or to any intermediate position in the tank. When so positioned in the tank the gasket annulus 154 will be compressed between the pan wall and the tank wall to prevent liquid passing between these walls. The fit between the tube 156 and the wall of pipe 107 is close enough to prevent fluid passing between these parts. Thus all liquid will be forced to flow through the material of the filter element, or elements.

While the filter cartridge as herein set forth and as embodied in the parent application is illustrated and described for use in association with ambulatory filtering apparatus, and also in connection with the use of pumping means for introducing the fluid to be filtered through a central tube into a receptacle above the filter cartridge, it will be understood that the invention is not restricted to the specific uses illustrated and described. For example, the filter in any one of the embodiments may be installed in a stationary filtering receptacle and while provision is made for introducing fluid through the filter cartridge to the upper side thereof, the fluid to be filtered may also be introduced through the open top of the receptacle. Also the pipe connection 110 may be used for draining off the filtered liquid by gravity from beneath the cartridge.

We claim:

1. A filter cartridge designed to fit in a cylindrical receptacle, said cartridge comprising a circular pan for positioning within such cylindrical receptacle and including a bottom and a surrounding wall, the bottom having a central opening, a tube fixed at one end in said opening and rising in and forming an integral part of the pan, a flat radially fluted annulus of paper filter material in the pan between said wall and tube, said pan bottom having drain apertures therethrough, and a gasket annulus encircling the outside of and secured to the pan wall.

2. A filter cartridge for insertion into a cylindrical receptable and to frictionally engage the inner wall of such receptacle for use, said cartridge comprising a circular body of paper filter material having substantially vertical portions in side by side relation and having an upper side and a lower side, said upper side lying in one plane and said lower side lying in one plane and said planes being substantially parallel, a circular wall of rigid material encircling and joined to the periphery of said circular body of filter material means forming a yieldable seal encircling the body and lying outside the diameter of said circular wall for sealingly engaging the inner wall surface of a cylindrical receptacle in which the cartridge is positioned for use, and means underlying and supporting said body of filter material and maintaining the body of filter material against bending or distortion by abnormal pressure of fluid against a side thereof.

3. A filter cartridge according to claim 2, wherein said last means comprises a base of rigid sheet material positioned against the lower side of the circular body of filter material and having said rigid circular wall joined to the periphery thereof and forming a pan therewith, the said base sheet and the body of filter material having concentric central openings and the said base sheet having a plurality of drain openings therein of materially smaller size than the said central openings.

4. A filter cartridge according to claim 2, wherein the said body of filter material is pleated and said vertical portions comprise joined walls of the pleats.

5. A filter cartridge according to claim 2, wherein the said body of filter material is in the form of a spirally wound band in which the layers of the band form the said vertical portions.

6. A filter cartridge according to claim 2, wherein the said body of filter material is pleated and is formed in two concentric annular parts joined to an annular division wall and wherein the said vertical portions comprise joined walls of the pleats.

References Cited in the file of this patent

UNITED STATES PATENTS

| | | |
|---|---|---|
| 729,693 | Steinkoenig | June 2, 1903 |
| 1,737,313 | Kamrath | Nov. 26, 1929 |
| 2,151,538 | Swanson | Mar. 21, 1939 |
| 2,326,967 | Poelman | Aug. 17, 1943 |
| 2,450,700 | Vokes | Oct. 5, 1948 |
| 2,463,825 | Strassheim | Mar. 8, 1949 |
| 2,473,986 | Booth | June 21, 1949 |
| 2,530,198 | Harvuot | Nov. 14, 1950 |
| 2,843,218 | Kickhaefer | July 15, 1958 |

FOREIGN PATENTS

| | | |
|---|---|---|
| 26,661 | Great Britain | 1908 |
| 494,322 | Canada | July 7, 1953 |